United States Patent
Chen et al.

(10) Patent No.: US 9,190,896 B2
(45) Date of Patent: Nov. 17, 2015

(54) PWM STRATEGY FOR REDUCTION OF INVERTER HOTSPOT TEMPERATURE AND OVERALL LOSSES

(75) Inventors: Lihua Chen, Northville, MI (US); Chingchi Chen, Ann Arbor, MI (US); Michael W. Degner, Novi, MI (US); Shahram Zarei, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 13/234,684

(22) Filed: Sep. 16, 2011

(65) Prior Publication Data

US 2013/0069570 A1   Mar. 21, 2013

(51) Int. Cl.
| | |
|---|---|
| *H02P 1/04* | (2006.01) |
| *G05B 11/28* | (2006.01) |
| *H02P 27/04* | (2006.01) |
| *H02M 1/32* | (2007.01) |
| *B60L 3/00* | (2006.01) |
| *B60L 11/00* | (2006.01) |

(Continued)

(52) U.S. Cl.
CPC ............... *H02M 1/32* (2013.01); *B60L 3/003* (2013.01); *B60L 11/005* (2013.01); *B60L 11/14* (2013.01); *B60L 11/1887* (2013.01); *B60L 15/007* (2013.01); *B60L 15/2009* (2013.01); *H02M 7/53871* (2013.01); *H02P 27/085* (2013.01); *H02P 29/0088* (2013.01); *H02P 29/027* (2013.01); *B60L 2210/40* (2013.01); *B60L 2220/14* (2013.01); *B60L 2240/423* (2013.01); *B60L 2240/525* (2013.01); *B60L 2240/527* (2013.01); *B60L 2240/529* (2013.01); *H02M 2001/0054* (2013.01); *H02M 2001/327* (2013.01); *Y02T 10/644* (2013.01); *Y02T 10/70* (2013.01); *Y02T 10/7022* (2013.01); *Y02T 10/7077* (2013.01); *Y02T 10/7241* (2013.01); *Y02T 10/7275* (2013.01); *Y02T 10/92* (2013.01); *Y02T 90/34* (2013.01)

(58) Field of Classification Search
USPC .................... 318/400.09, 599, 634, 788, 792
See application file for complete search history.

(56) References Cited

U.S. PATENT DOCUMENTS

| | | | |
|---|---|---|---|
| 7,362,069 B2 * | 4/2008 | Yamamoto et al. | ........... 318/599 |
| 7,414,376 B2 | 8/2008 | Sasaki et al. | |

(Continued)

FOREIGN PATENT DOCUMENTS

JP   2000069761 A2   3/2000

*Primary Examiner* — Eduardo Colon Santana
*Assistant Examiner* — Iftekhar Mustafa
(74) *Attorney, Agent, or Firm* — Maristyn Law LLC; Lynda F. Kouroupis; David B. Kelley

(57) ABSTRACT

A PWM strategy can be implemented to reduce device power losses and hotspot temperature in an inverter circuit that drives a synchronous motor. A method includes migrating a phase current from a power device with higher losses to a power device with lower losses. A PWM modulation signal can be modified to alter the inverter duty cycle and migrate phase current in the direction of lower losses. As an example, a PWM reference signal can be shifted to a lower value. A PWM loss reduction strategy can be performed while a motor is in a rotor-lock state to reduce device hotspot temperature. The PWM loss reduction strategy can also be performed when a motor is operating in a normal state, pushing PWM to DPWM, reducing switching and overall losses. The strategy can be practiced while a PMSM is operating as a motor, and can also be practiced during regenerative braking.

25 Claims, 10 Drawing Sheets

(51) Int. Cl.
*B60L 11/14* (2006.01)
*B60L 11/18* (2006.01)
*B60L 15/00* (2006.01)
*B60L 15/20* (2006.01)
*H02P 27/08* (2006.01)
*H02P 29/00* (2006.01)
*H02P 29/02* (2006.01)
*H02M 7/5387* (2007.01)
*H02M 1/00* (2007.01)

(56) References Cited

U.S. PATENT DOCUMENTS 7,542,251 B2 6/2009 Ivankovic
2010/0185350 A1* 7/2010 Okamura et al. ............... 701/22
2010/0277134 A1* 11/2010 Engelhardt et al. ............ 322/32
2012/0007552 A1* 1/2012 Song et al. ................... 320/109

* cited by examiner

REGULAR PWM CONTROL FOR ROTOR LOCK OPERATION

| ITEMS AND CONDITIONS | | PHASE A | PHASE B | PHASE C |
|---|---|---|---|---|
| PHASE CURRENT | | 500 A (FLOW OUT) | -250 A (FLOW IN) | -250 A (FLOW IN) |
| CASE 1: NO PWM LOSS STRATEGY | DUTY CYCLE | 0.527 | 0.487 | 0.487 |
| | IGBT POWER LOSS | 673 W | 292 W | 292 W |
| | DIODE POWER LOSS | 413 W | 172 W | 172 W |
| CASE 2: WITH PWM LOSS STRATEGY | DUTY CYCLE | 0.37 | 0.33 | 0.33 |
| | IGBT POWER LOSS | 551 W | 247 W | 247 W |
| | DIODE POWER LOSS | 545 W | 222 W | 222 W |

FIG. 10

PWM STRATEGY FOR REDUCTION OF INVERTER HOTSPOT TEMPERATURE AND OVERALL LOSSES

BACKGROUND OF INVENTION

1. Field of Invention

This invention relates to power electronic inverters, and more particularly to methods and apparatus to reduce hotspot temperatures and power losses for power devices in a power electronics inverter for a permanent magnet synchronous motor (PMSM).

2. Background Art

Electric machines, such as an electric or hybrid electric vehicles, can employ electrical energy for propulsion via an electric drive system that can include a power circuit, such as a power electronics inverter, coupled to a motor. In this arrangement, the power circuit can controllably transfer power from a power source to the motor to drive a load, such as the vehicle transaxle. For a three-phase synchronous motor, the power circuit can include an inverter with three phase legs, each leg comprising switches that can be individually controlled to provide a desired inverter output. As an example, drive signals that are a function of a motor's torque requirement can be provided to the inverter by an inverter controller. As is commonly practice, an inverter can be configured for bi-directional current flow so that current can flow from the inverter to the motor as well as from the motor to the inverter.

Because inverter current is tied to motor rotation and torque requirements, problems can arise during a "rotor-lock" or "motor-lock" mode when the angular rotation of the motor is substantially reduced or completely stopped. When a drive torque balances a vehicle weight, for example when a vehicle is climbing a slope, or when an obstacle is blocking a vehicle's wheels, an electric motor's rotation can slow or stop. A controller can attempt to increase torque/rotation by increasing the current provided to the motor. However, because the motor is not rotating sufficiently, the increased current can be concentrated in a single phase leg. For example, the current in one inverter phase leg can be twice the current in the remaining two phase legs. The high current concentration can heat up a switching device in the phase leg and increase the power losses associated with the device operation.

Given this phenomena, switching devices for an inverter are designed to tolerate a particular "hotspot" temperature that can be expected at the device during rotor-lock operation. The greater the hotspot temperature to be tolerated, the larger the size requirements of the device, and ultimately the greater the device cost. Unfortunately, the greater the rotor-lock current concentration and hotspot temperature, the higher the device losses, and the higher the overall operational losses of the power conversion system.

Various attempts have been made to reduce power losses under rotor-lock conditions. A traditional solution is to decrease the pulse-width modulation (PWM) switching frequency to reduce inverter power losses. Although this solution may reduce inverter switching losses, it has limited effects because conduction losses are typically the dominating factor in power device losses. More recently, various software-oriented solutions have been proposed. For example, U.S. patent publication 2010/0185350 entitled "Control Device for Electric-Powered Vehicle and Electric-Powered Vehicle with Control Device as Well as Control Method for Electric-Powered Vehicle, and Computer Readable Recording Medium Bearing Program for Causing Computer to Execute Control Method" and assigned to Toyota Jidosha Kabushiki Kaisha discloses a carrier frequency setting unit that sets a carrier frequency (FC) according to the torque command (TR) of a motor generator and the number of motor rotations (MRN). A PWM signal generation unit generates phase modulation waves corresponding to respective phase voltage commands (Vu,Vv, Vw) and generates phase PWM signals (Pu, Pv, Pw) according to the magnitude relationship between each of the phase modulation waves and a carrier wave having the carrier frequency (FC). A PWM center control unit, when the carrier frequency (FC) is lower than a predetermined frequency, generates a PWM center correction value ($\Delta$CE) for variably controlling a PWM center and outputs to the PWM signal. The Toyota publication teaches a carrier frequency dependent solution to the problem of inverter overheating. However, there remains a need for an economical, hardware-oriented solution that can be employed regardless of, and independent of PWM carrier frequency to reduce device power losses and hotspot temperatures.

OVERVIEW OF INVENTION

An example system includes an inverter circuit and a pulse-width modulation (PWM) strategy module configured to migrate an inverter phase current from a higher loss device to a lower loss device to reduce inverter hotspot temperature and power losses. In an example embodiment, a PWM strategy module can be configured to migrate phase current when a motor coupled to the inverter circuit is in a motor-lock state. By way of example, but not limitation, current can be migrated from an insulated gate bipolar transistor (IGBT) having relatively higher losses, to a diode in the same phase leg having relatively lower losses. The PWM strategy module can be configured to modify a PWM modulation signal used to provide PWM control signals to satisfy motor command voltages. The PWM strategy module can be configured to migrate current without affecting carrier frequency or inverter output.

In an example embodiment, a PWM strategy module can include a strategy control module configured to implement a loss reduction strategy in which inverter phase current is migrated from a higher loss device to a lower loss device. In an exemplary embodiment, the PWM strategy module can be configured to modify a modulation signal used to modulate a PWM carrier signal. In an example embodiment, the PWM strategy module can direct a shift signal module to provide a shift signal that can be combined with a PWM modulation signal to provide a shifted modulation signal. An exemplary PWM strategy module can be configured to migrate inverter phase current when a motor is in a rotor-locked state. Accordingly, a PWM strategy module can include a status determination module configured to determine that a motor is in a rotor-lock state. However, a PWM strategy module can also be configured to migrate current when a motor is in a normal, "non-locked" state in order to reduce switching losses in the inverter.

An example method for the reduction of hotspot temperature can include determining that a motor is in a rotor-lock state, implementing a hot-spot reduction PWM strategy, determining that a motor is no longer in a rotor-lock state and ceasing implementation of the hot-spot reduction strategy. In an example embodiment, a method of the invention can include migrating a phase current from a higher loss device to a lower loss device in a phase leg of an inverter circuit. For example, current can be migrated from an insulated gate bipolar transistor (IGBT) to a diode. In an example method, a low frequency modulation signal used in conjunction with a high frequency carrier signal to provide PWM control signals to an inverter, can be modified. For example, a PWM reference voltage can be shifted to a lower value. In an example embodiment, the current migration process does not depend on the carrier frequency and does not affect inverter output. A method of the invention can provide a hardware-oriented solution compatible with all switching frequencies that can reduce inverter hot-spot temperatures and power losses, and thereby enable the use of smaller, less expensive power electronic devices in the inverter circuit.

BRIEF DESCRIPTION OF THE DRAWINGS

FIG. 10 shows a comparison of results for an inverter circuit with and without implementing a PWM loss reduction strategy.

DETAILED DESCRIPTION OF EXAMPLE EMBODIMENTS

Example embodiments of the invention are presented herein; however, the invention may be embodied in a variety of alternative forms, as will be apparent to those skilled in the art. To facilitate understanding of the invention, and provide a basis for the claims, various figures are included in the description. The figures are not drawn to scale and related elements may be omitted so as to emphasize the novel features of the invention. Structural and functional details depicted in the figures are provided for the purpose of teaching the practice of the invention to those skilled in the art and are not to be interpreted as limitations. For example, control modules and components for various systems can be variously arranged and/or combined, and are not to be considered limited to the example configurations presented herein.

Figure 1:
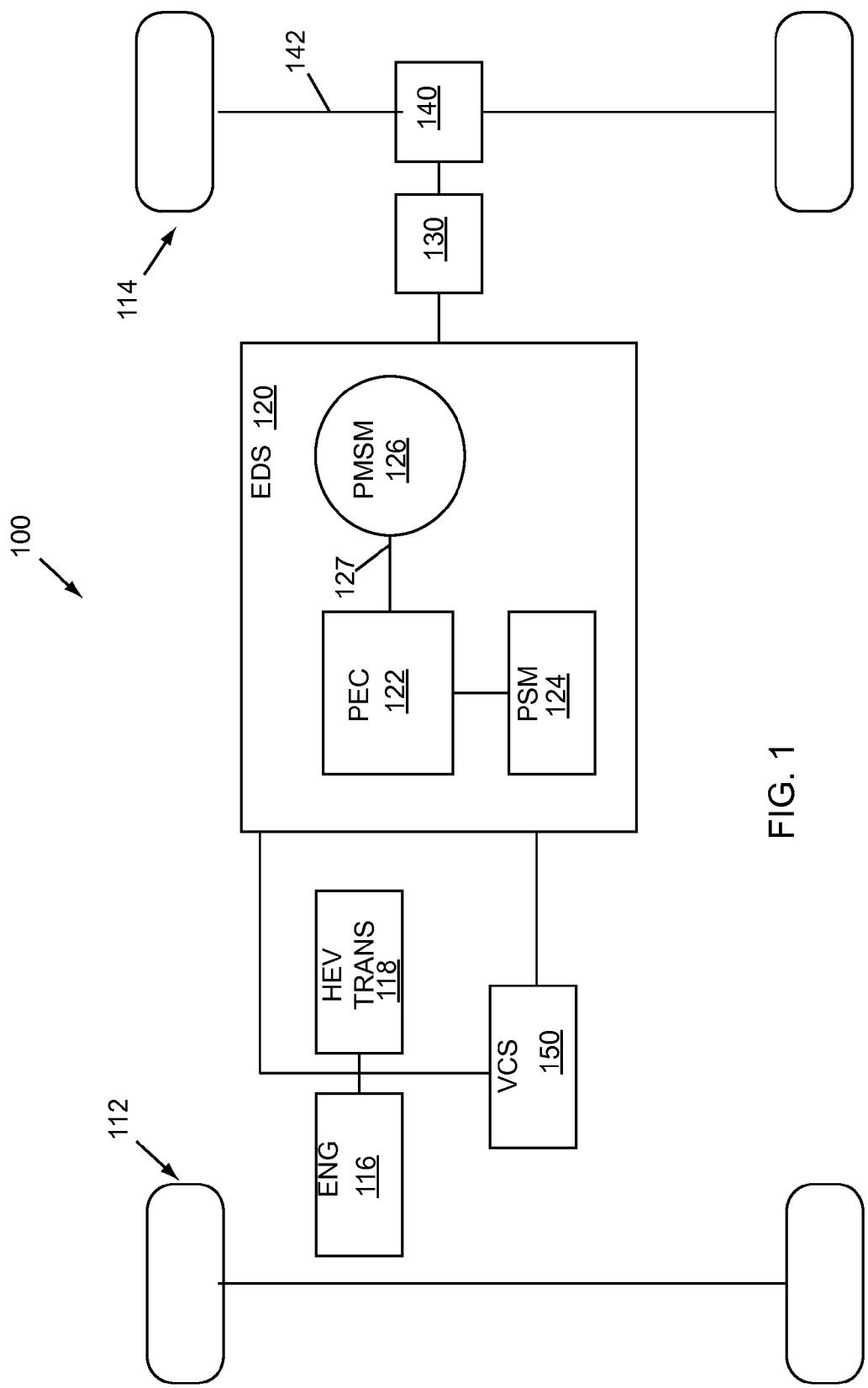
FIG. 1 shows an example system having a PWM strategy module (PSM).

FIG. 1 illustrates a schematic of an example vehicle 100. The vehicle 100 may be of any suitable type, such as an electric or hybrid electric vehicle. In at least one embodiment, the vehicle 100 may include a first wheel set 112, a second wheel set 114, an engine 116, HEV transaxle 118 and an electric drive system 120. The electric drive system 120 may be configured to provide torque to the first and/or second wheel sets 112, 114. The electric drive system 120 may have any suitable configuration; for example, it may include a power conversion circuit in the form of a power electronics converter (PEC) 122 coupled to a permanent magnet synchronous machine (PMSM) 126. The PMSM 126 can be coupled to a power transfer unit 130, which in turn can be coupled to a differential 140 to control the wheel set 114. It is contemplated that the PMSM 126 can function as a motor, converting electrical energy to kinetic energy, or as a generator, converting kinetic energy to electrical energy. In an example embodiment, the PEC 122 can be connected to a first PMSM functioning as a motor via an interface cable 127, and a second PMSM (not shown) functioning as a generator via a second interface cable (not shown). Moreover, in a hybrid electric vehicle the electric drive system 120 may be a parallel drive, series drive, or split hybrid drive as is known by those skilled in the art. The interface cable 127 can be a high-voltage three-phase interface cable by which the PEC 122 can provide power to the PMSM 126. In an exemplary embodiment, the cable 127 is configured to conduct three currents of different phases. For example, the cable 127 can comprise a set of three cables, each configured to carry a current of a particular phase.

The PEC 122 can include hardware circuitry configured to provide power to the PMSM 126 and can be electrically coupled to a Vehicle Control System (VCS) 150 from which it may receive signals from other control units regarding vehicle system operation and control. The PEC 122 can be coupled to a pulse-width modulation (PWM) Strategy Module (PSM) 124 configured to use PWM strategies to control and improve PEC performance. In an example embodiment, the PSM 124 controls a PWM modulation signal to reduce PEC power losses, particularly during those periods in which a motor is in a "motor lock" or "rotor lock" state.

The PMSM 126 can be powered by one or more power sources to drive the vehicle traction wheels. The PMSM 126 may be of any suitable type, such as a motor, motor-generator, or starter-alternator. In addition, the PMSM 126 may be associated with a regenerative braking system for recovering energy.

The power transfer unit 130 may be selectively coupled to at least one PMSM 126. The power transfer unit 130 may be of any suitable type, such as a multi-gear "step ratio" transmission, continuously variable transmission, or an electronic converterless transmission as is known by those skilled in the art. The power transfer unit 130 may be adapted to drive one or more vehicle wheels. In the embodiment shown in FIG. 1, the power transfer unit 130 is connected to a differential 140 in any suitable manner, such as with a driveshaft or other mechanical device. The differential 140 may be connected to each wheel of the second wheel set 114 by a shaft 142, such as an axle or halfshaft.

Figure 2:
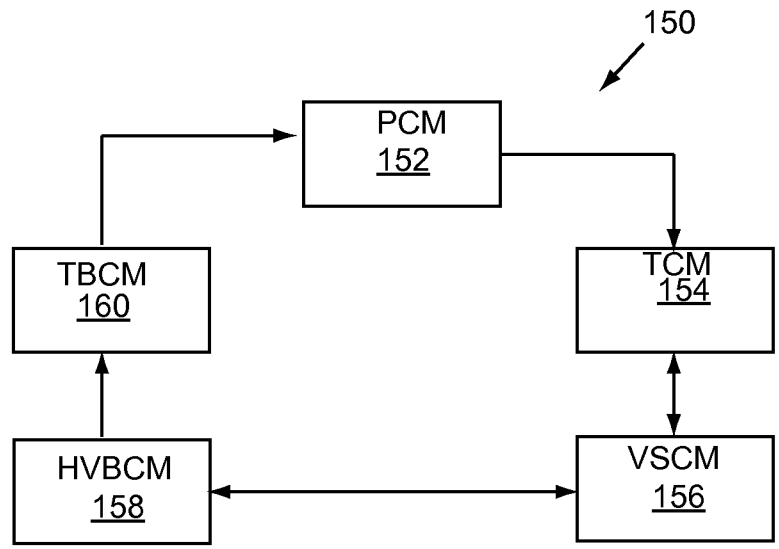
FIG. 2 shows an example system.

The vehicle 100 can also include a vehicle control system (VCS) 150 for monitoring and/or controlling various aspects of the vehicle 100. The VCS 150 can be coupled to the PEC 122, and the power transfer unit 140 and their various components to monitor and control operation and performance. The VCS 150 can have any suitable configuration and may include one or more controllers or control modules. In the exemplary embodiment shown in FIG. 2, the VCS 150 includes a powertrain control module (PCM) 152, a transaxle control module (TCM) 154, a vehicle stability control module (VSCM) 156, a high voltage battery control module (HVBCM) 158, and a traction batter control module (TBCM) 160. The control modules 152-160 may be configured to communicate with each other as indicated by the arrowed lines, however it is contemplated that communication between and among the control modules can be variously arranged. In addition, one or more control modules 152-160 may be configured to communicate with and/or control various aspects of the vehicle 100. For instance, the TBCM 160 may monitor environmental attributes (e.g., temperature) and control the operation of one or more power sources. The transaxle control module TCM 154 may communicate with the PEC 122 to control the PMSM 126 and the amount of torque provided to the vehicle traction wheels. It is noted that the TCM 154 may alternatively be embedded within the PEC 122.

Figure 3:
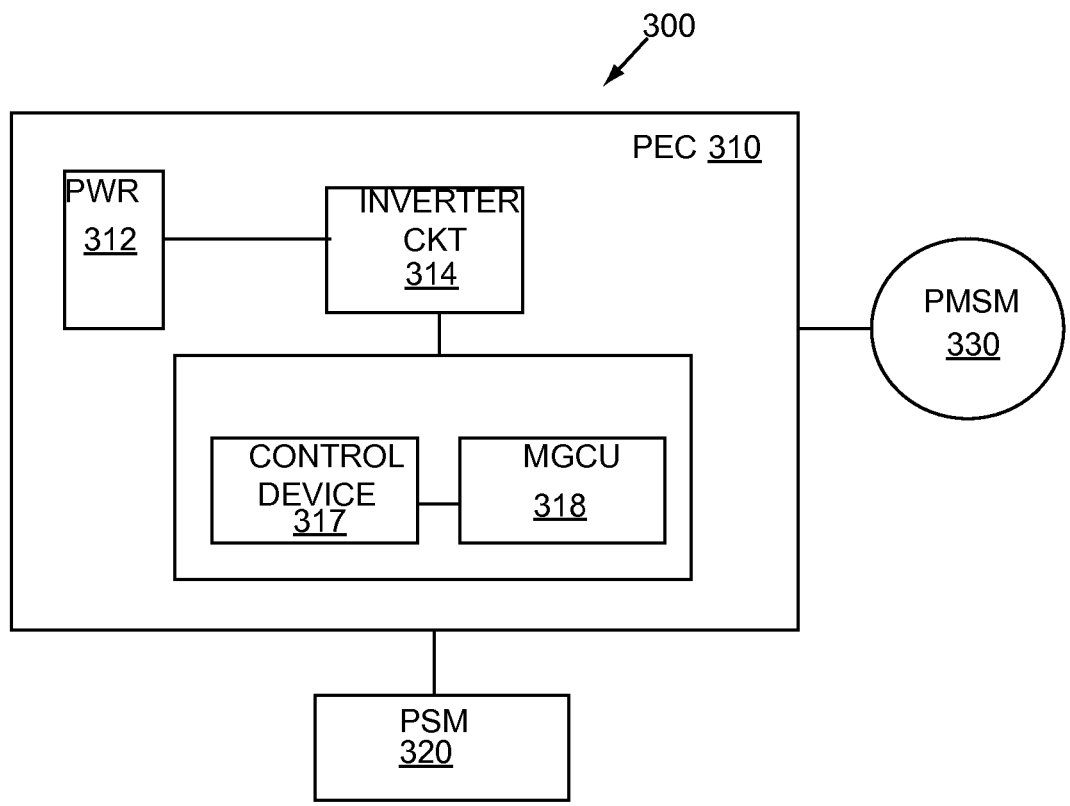
FIG. 3 shows an example system.

FIG. 3 shows an example system 300 in which the PEC 122 of FIG. 1 is embodied as example PEC 310. The PEC 310 can include a first power source 312. In various embodiments, such as hybrid electric vehicle embodiments, additional power systems may be provided. For instance, a second power system may be provided that has an electrical power source or non-electrical power source like an internal combustion engine. The first power source 312 may be of any suitable type. For instance, the first power source 312 may be an electrical power source such as a battery having a plurality of electrically interconnected cells, a capacitor, or a fuel cell. If a battery is used it may be of any suitable type, such as nickel-metal hydride (Ni—MH), nickel-iron (Ni—Fe), nickel-cadmium (Ni—Cd), lead acid, zinc bromine (Zn—Br), or lithium based. If a capacitor is used it may be of any suitable type, such as an ultra capacitor, super capacitor, electrochemical capacitor, or electronic double layer capacitor as is known by those skilled in the art. In an example embodiment, a battery can be used in conjunction with one or more capacitors.

The power source 312 can be coupled to an inverter circuit 314 configured to provide alternating current to the PMSM 330. An inverter controller 316, configured to provide PWM drive signals, can be coupled to the inverter circuit 314. A PSM 320 can be coupled to the inverter controller 316 to execute a PWM strategy for reducing power losses in the inverter circuit 314, particularly, but not limited to, during those periods in which the PMSM 330 is in a locked stated. In an exemplary embodiment, a rotation sensor (not shown) can be coupled to the PMSM 330 and configured to provide a motor rotation number, to the PEC 310, the PSM 320 and/or the VCS 150.

The inverter controller 316 can be configured to control operation of the inverter circuit 314, and accordingly can include hardware, software, firmware, or some combination thereof. The inverter controller 316 can include a microprocessor-based control device 317 for performing control functions and processing information. The control device 317 can be configured to execute software algorithms as well as store information. The inverter controller 316 can include a motor/generator control unit (MGCU) 318. In an example embodiment, the MGCU 318 can be in the form of a printed circuit board having the circuitry necessary to receive feedback current, receive or establish reference currents and voltages, regulate current, and command voltages and currents, as well as perform other operations associated with the command and control of the PMSM 330. The inverter controller 316 can receive input from a sensor (not shown) that detects current within the cable 127. For example, feedback current detected by such a sensor can be received at the MGCU 318. The inverter controller 316, for example via the MGCU 318, can also receive input from a sensor (not shown) configured to detect PMSM 330 motion. The inverter controller 316 can function as an interface between the PSM 320 and the inverter circuit 314, enabling the PSM 320 to affect operation of the inverter circuit 314 by implementing PWM strategies through the inverter controller 316.

Figure 4A:
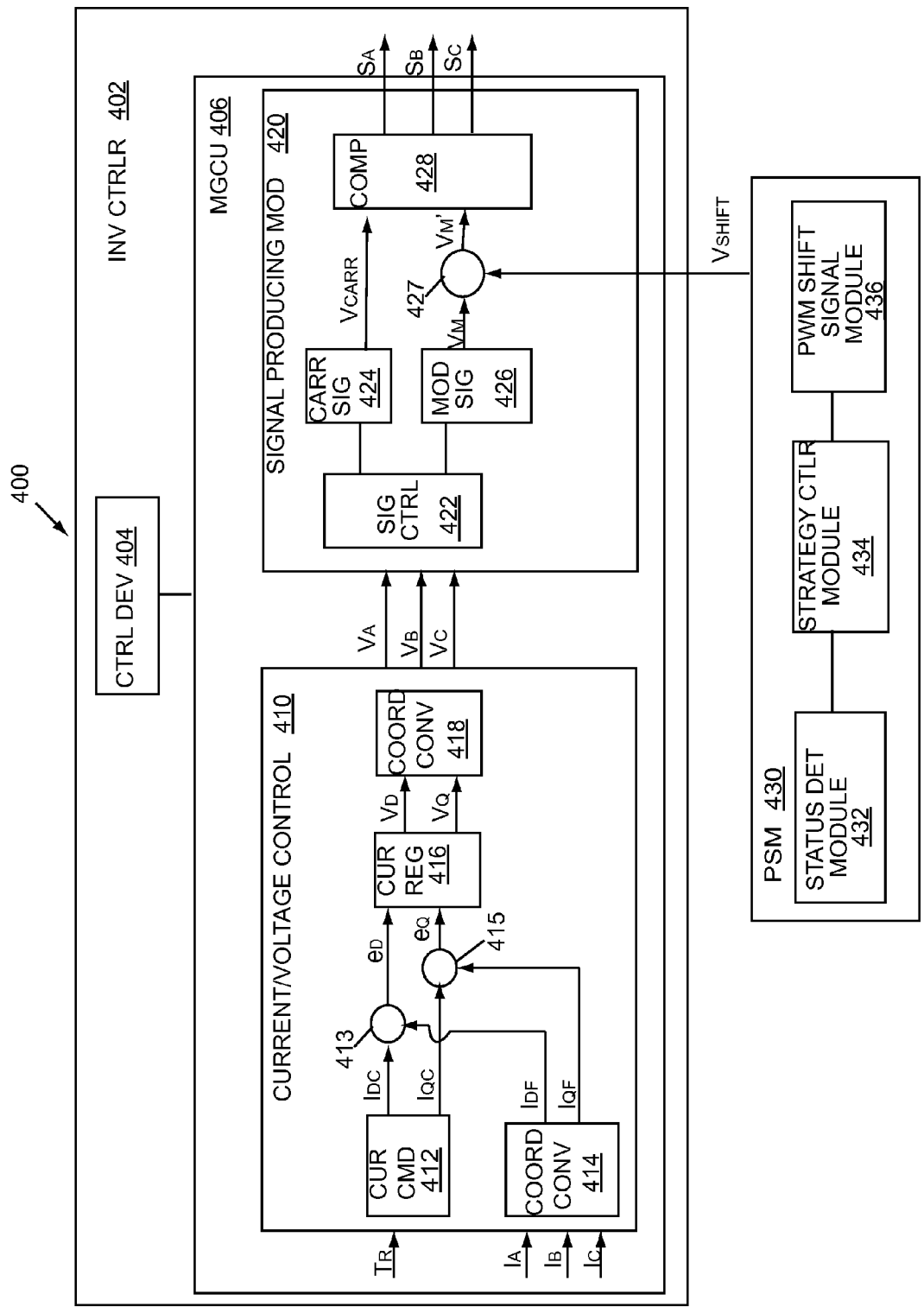
FIG. 4A shows an example system.

FIG. 4A shows a system 400 in which the inverter controller 316 is embodied as an example inverter controller 402, and the PSM 320 is embodied as example PSM 430. The inverter controller 402, which can include a control device 404 coupled to a MGCU 406, can be coupled to the PSM 430. The example MGCU 406 can include a current/voltage control unit 410, configured to provide required stator winding voltages based on torque requirements, and a PWM signal producing module 420 for producing the PWM drive signals for the inverter circuit 314.

Figure 4B:
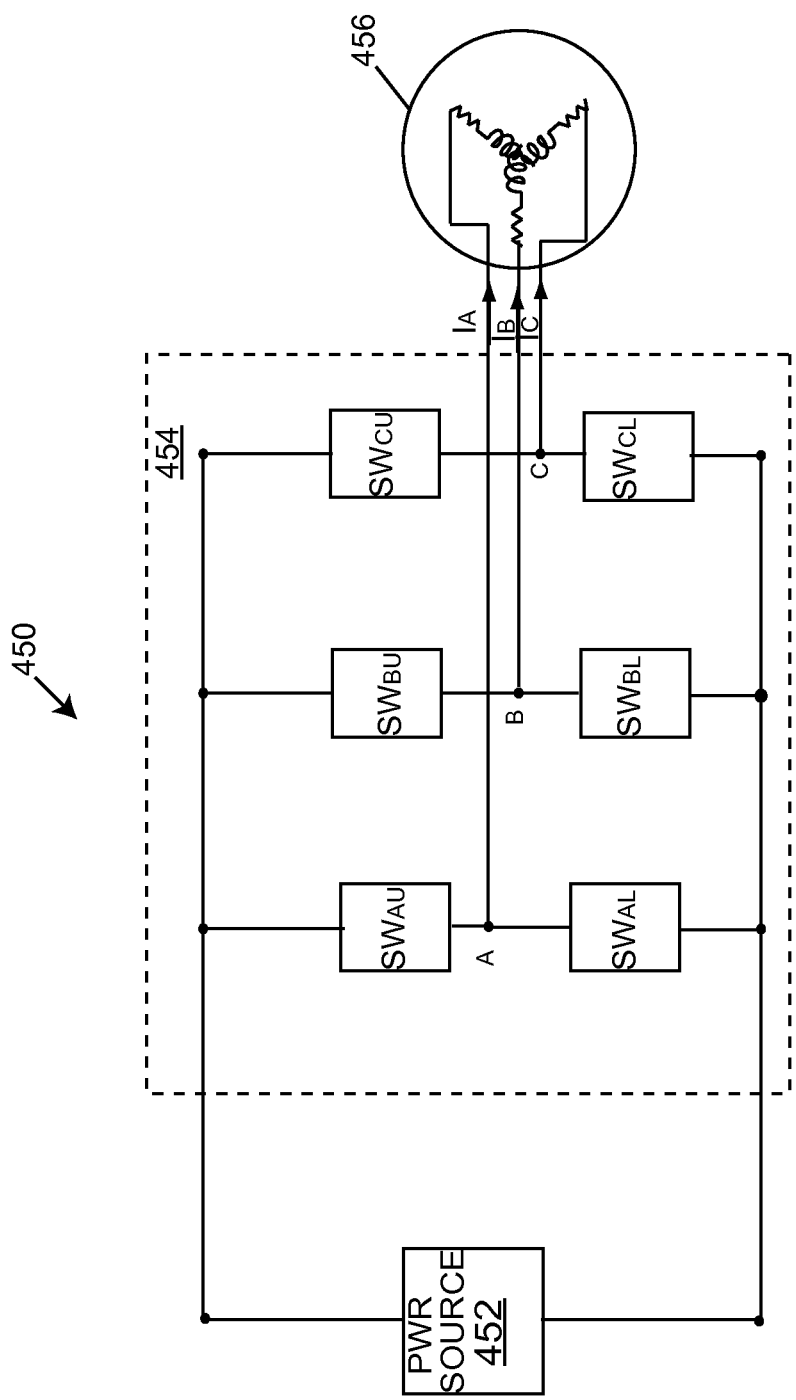
FIG. 4B shows an example system.

FIG. 4B shows an example embodiment 450 in which a power source 452 is coupled to an inverter circuit 454. The inverter circuit 454 comprises a phase leg A, having an upper switching unit AU and a lower switching unit AL, a phase leg B comprising an upper switching unit BU and a lower switching unit BL, and an phase leg C comprising an upper switching unit CU and a lower switching unit CL. A phase current IA is associated with phase leg A, a phase current IB is associated with phase leg B, and a phase current IC is associated with phase leg C. Each of the phase currents IA, IB, IC is provided to a stator winding of the three-phase PMSM 456. In an example embodiment, the PWM signal producing module 420 produces drive signals for the three phase legs of the inverter circuit 454.

Referring back to FIG. 4A, by way of example, but not limitation, the current/voltage control unit 410 can include a command current unit 412 configured to receive a torque requirement $T_R$ and output required command currents $I_{DC}$ and $I_{QC}$ in the d-q coordinate system of the PMSM rotor. In addition, a coordinate conversion unit 414 can be configured to receive $I_A$, $I_B$, $I_C$, feedback phase currents and convert them to the d-q coordinate system to provide output $I_{DF}$ and $I_{QF}$. The direct feedback and command currents $I_{DF}$ and $I_{DC}$ can be received at comparator 413 which can be configured to produce an output $e_d$ based on the difference between them. Similarly, the quadrature feedback and command currents $I_{QF}$ and $I_{QC}$ can be received at the comparator 415 which can be configured to output $e_Q$ based on the difference between them. The current regulator 416 can be configured to receive $e_D$ and $e_Q$, and use them to provide output voltages $V_D$ and $V_Q$, as known in the art. The coordinate conversion unit 418 can convert $V_D$ and $V_Q$ from the rotor coordinate system to produce the phase voltages $V_A$, $V_B$, and $V_C$ for the stator coils 532, 534, and 536 respectively. The three phase voltages $V_A$, $V_B$, and $V_C$ can be provided to the PWM signal producing module 420 which is configured to use the phase voltages $V_A$, $V_B$, $V_C$ to provide the appropriate drive signals $S_A$, $S_B$, $S_C$ for the inverter circuit 454. For example, $S_A$ can be applied to phase leg A, $S_B$ can be applied to phase leg B, and $S_C$ can be applied to phase leg C of inverter circuit 454.

The PWM signal producing module 420 can include a PWM signal controller 422, a carrier signal module 424, a modulation signal module 426, and a comparator 428. The carrier signal module 424 can be configured to provide a carrier signal $V_{CARR}$, which can provide a switching frequency for PWM. By way of example the carrier signal module 424 can comprise a high frequency signal generator. In an example embodiment, the carrier signal module 422 can be configured to produce a triangle wave carrier signal characterized by a frequency ranging from 1.25 Khz to 10 Khz, and can be controlled by the PWM signal controller 422.

The modulation signal module 426 can be configured to provide a PWM modulation signal $V_M$, and by way of example can comprise a low frequency or dc signal generator. In an example embodiment, the modulation signal $V_M$ can be in the form of, or characterized by, a reference voltage $V_R$ for each phase leg, for example $V_{RA}$, $V_{RB}$ and $V_{RC}$ for inverter circuit 454 phase legs A, B, and C. As such, the modulation signal module can comprise one or more devices configured to provide a reference voltage. The PWM signal controller 422 can be configured to receive the voltages $V_A$, $V_B$, $V_C$, and, based on those voltages, direct the carrier signal and modulation signal modules 424, 426 to provide output that can be used to provide appropriate PWM drive signals $S_A$, $S_B$, $S_C$ for the inverter circuit 454. By way of example, but not limitation, the drive signals $S_A$, $S_B$, $S_C$ can be in the form of voltage levels and duty cycle applied to the gates of the various switching units of the inverter circuit 454 phase legs A, B, and C.

The PSM 430 can be configured to implement or direct a PWM strategy to reduce hotspot temperature and power losses in the system 400. In an example embodiment, the PSM 430 can include a status detection module 432, a strategy control module 434, and a modulation signal module 436. Each of the modules can comprise hardware, software, firmware, or some combination thereof. The status determination module 432 can be configured to determine that a motor, such as the PMSM 456, coupled to an inverter circuit, such as the inverter circuit 454, is in a rotor-lock state. In an example embodiment, the status detector 432 can receive input regarding feedback currents $I_A$, $I_B$, $I_C$, and a high current continuously concentrated in a single phase leg can be used as an indication that a motor is locked. By way of example, but not limitation, the status determination module can receive input regarding motor rotation, either from the VCS 150, from the MGCU 320, or directly from an angular rotation sensor (not shown) coupled to the motor. An angular rotation number lower than a predetermined minimum can indicate that a motor is in a locked state.

The PSM 430 can further include a strategy control module 434 configured to execute a PWM strategy for reducing device hotspot temperature and power losses. In an exemplary embodiment, the strategy control module 434 can shift a PWM modulation signal to implement a hotspot and loss reduction strategy. By way of example, but not limitation, under direction of the strategy control module 434, a shift signal module 436 can be configured to provide a shift signal $V_{SHIFT}$ to the PWM signal producing unit 420. The signal $V_{SHIFT}$ can be combined with the modulation signal $V_M$ at the signal combiner 427 to provide a shifted modulation signal $V_M'$ that can be provided to the comparator 428 and used to produce the control signals $S_A$, $S_B$, $S_C$. In an exemplary embodiment, the modulation signal $V_M$ can be in the form of the reference signal $V_R$, and the signal $V_{SHIFT}$ can be added to the reference signal $V_R$ at the signal combiner 427 to provide a shifted $V_R'$ which can be input to the comparator 428. Accordingly a shifted $V_{RA}'$, $V_{RB}'$ and $V_{RC}'$ can be provided for the phase legs A, B, and C respectively. The comparator can compare $V_R'$ and the carrier signal $V_{CARR}$ to produce shifted PWM signals $S_A$, $S_B$, $S_C$. In an example embodiment, the signal $V_{SHIFT}$ can shift the reference voltage $V_R$ downward, i.e. $V_{SHIFT}$ can have a negative value, or be subtracted from $V_R$. Shifting the reference voltage $V_R$ can change the PWM signals and decrease the inverter duty cycle, decreasing conduction losses. In addition, changing the PWM signals can migrate a phase current from a device with higher conduction losses, such as an IGBT, to a device with lower conduction losses, such as a diode.

Figure 5:
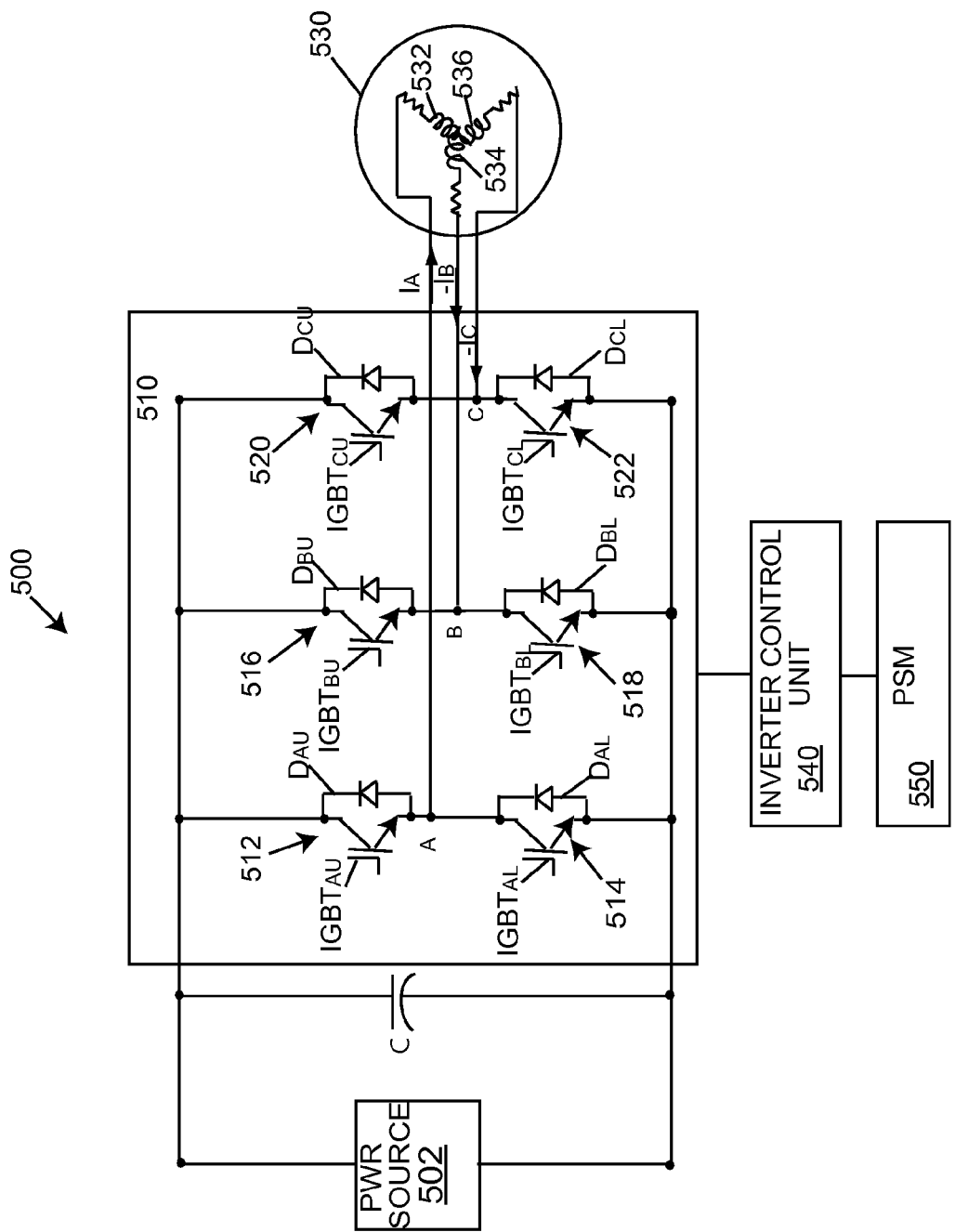
FIG. 5 shows an example system.

FIG. 5 shows an example system 500 in which a PWM strategy module can reduce hotspot temperature and power losses. The system 500 includes a power source 502 coupled to an inverter circuit 510 via a capacitor C. The inverter circuit 510 is coupled to a motor 530 and an inverter control unit 540 configured to provide drive signals for the inverter circuit 510. In an exemplary embodiment, the motor 530 is a PMSM comprising three separate coils 532, 534 and 536. The inverter circuit 510 can include three phase legs, A, B, and C, coupled to the coils 532, 534 and 536 respectively, and associated with phase currents $I_A$, $I_B$, and $I_C$ respectively, which are considered to have a positive direction when flowing to the motor 530, and a negative direction when flowing from the motor 530.

Each of the phase legs A, B, and C can have an upper and lower switching unit, with each switching unit having an active device, such as an IGBT, and a semi-active device such as a diode. For example, the phase leg A can have an upper switching unit 512 comprising $IGBT_{AU}$ in antiparallel with an upper diode $D_{AU}$, and a lower switching unit 514 comprising lower $IGBT_{AL}$ in antiparallel with lower diode $D_{AL}$. Similarly, phase leg B can have an upper switching unit 516 comprising upper $IGBT_{BU}$ in antiparallel with an upper diode $D_{BU}$, and a lower switching unit 518 comprising lower $IGBT_{BL}$ in antiparallel with lower diode $D_{BL}$. Likewise, phase leg C can include upper switching unit 520 comprising upper $IGBT_{CU}$ and upper diode $D_{CU}$ and lower switching unit 522 comprising lower $IGBT_{CL}$ and lower diode $D_{CL}$.

During a typical non motor-lock PWM cycle, current flows through one device of a switching unit at a time, and one switching unit of a phase leg at a time, so that during a normal operation mode the total power for a phase leg during an inverter cycle is divided among four devices. However, during a motor-lock state, some switching devices do not operate at all, forcing the power in a phase leg to be divided by only 2 devices, thereby increasing device power loss and temperature. For example, in a motor-lock state the upper diode $D_{AU}$ and the lower $IGBT_{AL}$ may not conduct, the $IGBT_{BU}$ and the diode $D_{BL}$ may not conduct, and the $IGBT_{CU}$ and the diode $D_{CL}$ may not conduct. Thus in each phase leg, current can be concentrated in two devices, rather than four, increasing the loss and temperature at the conducting IGBT devices.

Figure 6:
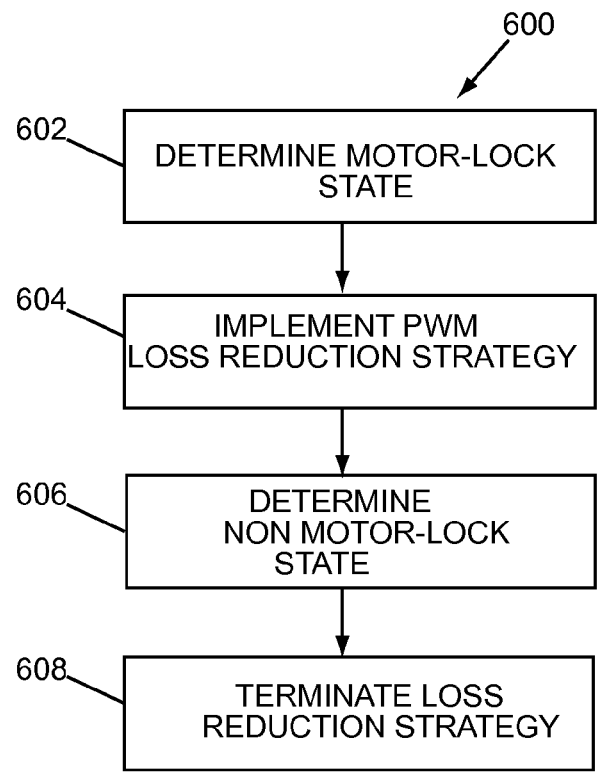
FIG. 6 shows a flow diagram of an example method.

FIG. 6 shows an example method 600 for reducing hotspot temperature. At block 602 a determination can be made that a motor is in a rotor lock state. For example, the status determination module 432 can receive input regarding the phase currents $I_A$, $I_B$, $I_C$, and compare their magnitudes to determine that a motor is locked. For example, a high current continuously concentrated a single phase leg can indicate a rotor lock condition. By way of further example, the status determination module 432 can receive input regarding motor rotation, either from the VCS 150, from the MGCU 320, or directly from an angular rotation sensor coupled to the motor. An angular rotation number lower than a predetermined minimum can indicate that a motor is in a locked state.

Figure 7:
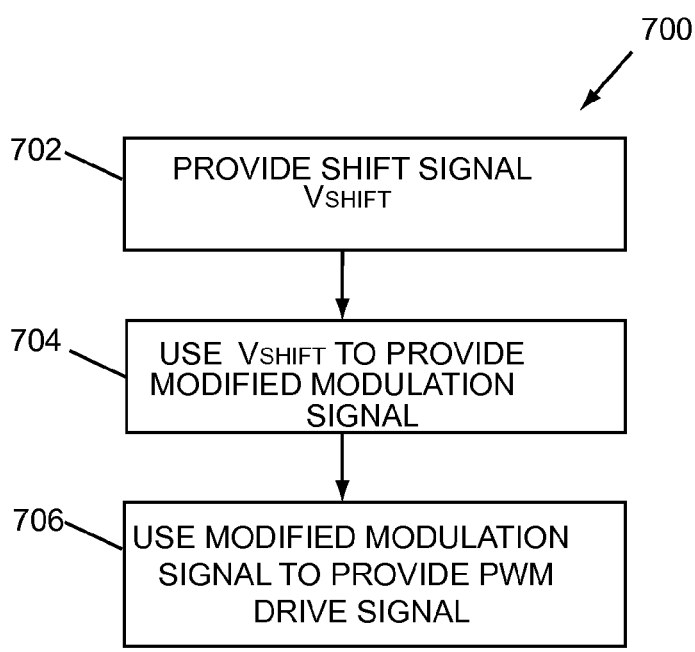
FIG. 7 shows a flow diagram of an example method.

At block 604, a loss reduction PWM strategy can be implemented. In an example embodiment, implementation of a loss reduction PWM strategy can include migrating a current from a higher loss device to a lower loss device. As an example, current can be migrated from the $IGBT_{AU}$ to the $D_{AL}$. FIG. 7 shows an example method 700 for migrating the current. At block 702 a shift signal $V_{SHIFT}$ can be provided. For example, the strategy controller module 434 can prompt the shift signal generator 436 to generate a shift signal $V_{SHIFT}$. At block 704, the shift signal $V_{SHIFT}$ can be used to provide a modified PWM modulation signal. For example, $V_{SHIFT}$ can be combined with $V_M$ from the modulation signal module 426 to provide a modified modulation signal $V_M'$. In an example embodiment, the modulation signal $V_M$ is in the form of a reference voltage $V_R$. The modulation signal generator 426 can be configured to provide a reference voltage for each inverter phase leg, namely $V_{RA}$, $V_{RB}$, and $V_{RC}$ for the phase legs A, B, and C, and the shift signal $V_{SHIFT}$ can be added to each to provide shifted references $V_{RA}'$, $V_{RB}'$, and $V_{RC}'$. In an exemplary embodiment, the shift signal $V_{SHIFT}$ is the same for each phase leg, however it is contemplated that it could vary among the phase legs. At block 706 the shifted modulation signal $V_M'$ can be used to provide a PWM drive signal.

For example, $V_M'$ can be compared with a carrier signal $V_{CARR}$ at the comparator 428 to provide a PWM driver signal for the inverter circuit 510.

In an example embodiment the carrier and shifted modulation signals can produce PWM drive signals that can migrate a phase current from a higher loss device to a lower loss device, for example from the $IGBT_{AU}$ to the diode $D_{AL}$. Because implementation of the invention can reduce the average current concentration conducted through an IGBT, an IGBT hotspot temperature can be reduced.

Referring back to FIG. 6, the example method 600 can further include, at block 606, determining that a motor is no longer in a rotor-lock state. For example, the status detection module 432, using input described above, can determine that the rotor-lock state is no longer in effect. In response, at block 608, operation can revert to a normal operation mode in which no shifting is performed, and $V_M$ rather than $V_M'$ is used to produce PWM drive signals for the inverter. This can be achieved by ceasing production of the shift signal $V_{SHIFT}$.

It is noted that a method of invention can include PWM shifting even when the motor is in a normal, or non-locked state. PWM shifting during a normal operating state can push PWM to the extreme, resulting in discontinuous pulse width modulation (DPWM), which can minimize switching losses. As a result, inverter overall power losses can be reduced, increasing the fuel economy of electric vehicles.

Figure 8A:
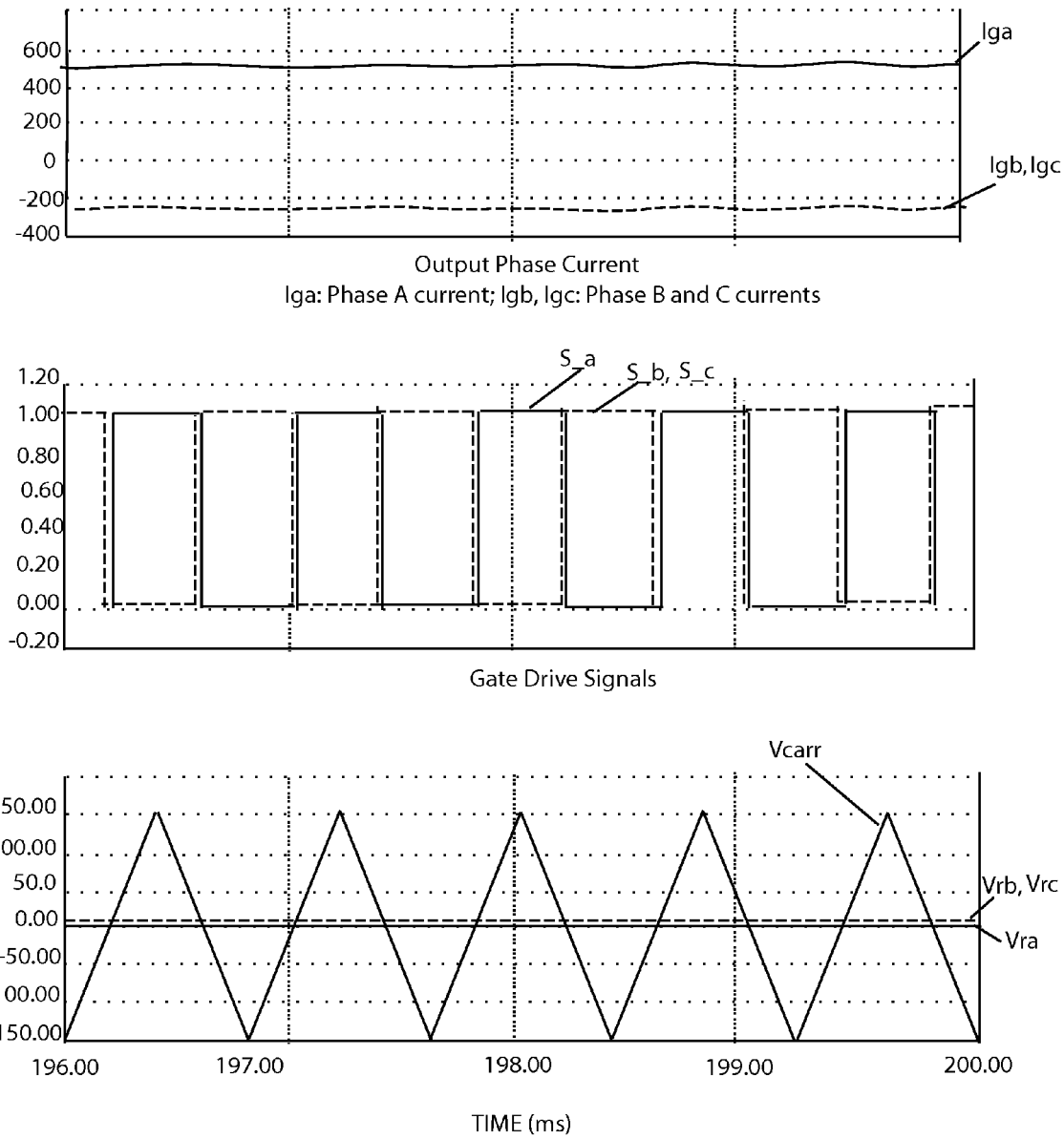
FIG. 8A shows inverter currents and signals for an example inverter circuit without PWM shifting.
Figure 9:
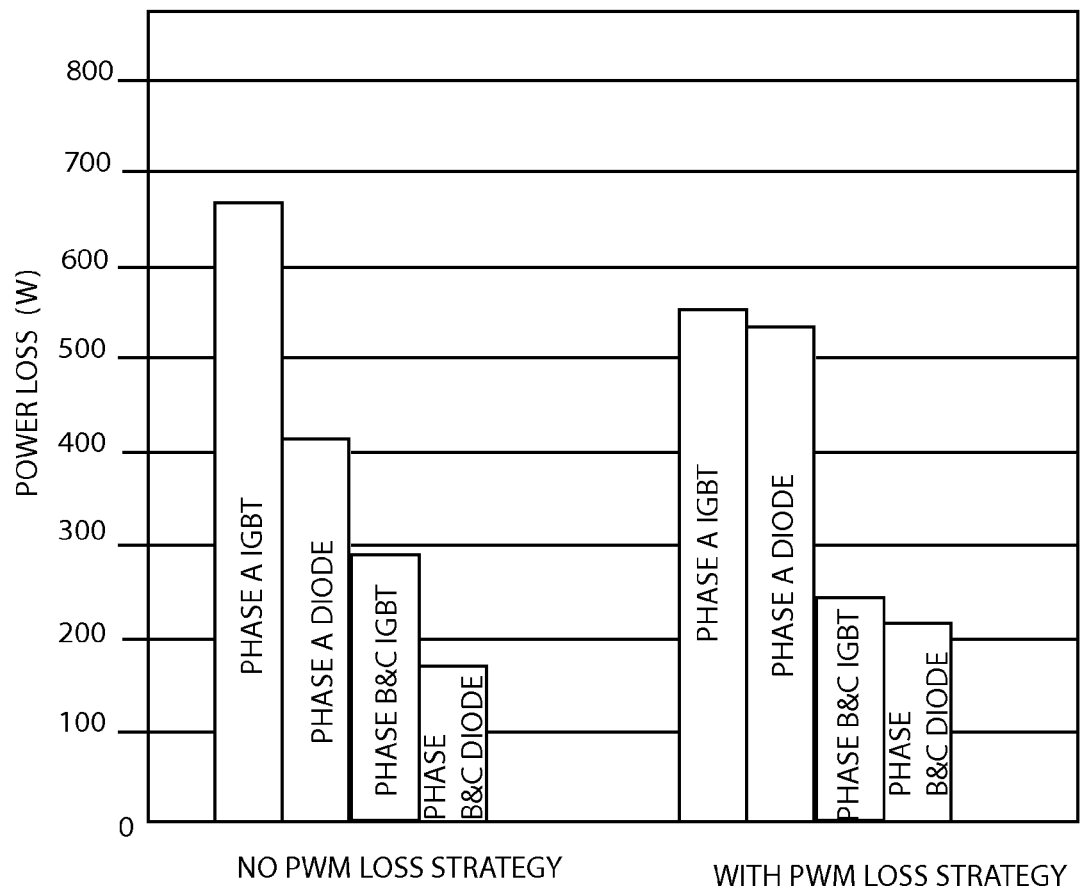
FIG. 9 shows a comparison of results for an inverter circuit with and without implementing a PWM loss reduction strategy.

FIG. 8A shows the results for a system, such as the system 500, in which a motor is in a rotor-locked state and PWM signaling is performed in a normal, unshifted manner, i.e. there is no $V_{SHIFT}$ signal generated. In this example, a modulation signal $V_M$ is in the form of reference voltages $V_{RA}$, $V_{RB}$ and $V_{RC}$ respectively. The carrier wave $V_{CARR}$ can be used with the aforementioned reference voltages, to produce the PWM signals S_a, S_b, and S_c for the A, B, and C inverter phase legs. Inverter phase currents are represented by Iga, Igb, and Igc, with positive magnitudes indicating current flow from inverter to motor, and negative magnitudes indicating current flow from motor to inverter. As shown in FIG. 8A, the magnitude of the current Iga, flowing from inverter to motor is approximately twice the magnitude of the currents Igb, Igc flowing from motor to the inverter, indicative of a motor lock state. FIGS. 9, 10 show inverter duty cycle and power losses for the three phase legs of the inverter during normal (unshifted) PWM for the conditions represented by FIG. 8A. Referring to FIGS. 8A, 9 and 10, it can be seen that the duty cycle for phase leg A is only slightly longer than that of the other phase legs, but the power loss for phase leg A is substantially higher than that of the other phase legs. This is because current is concentrated in the $IGBT_{UA}$, which has relatively high power losses which include conduction and switching power losses.

Figure 8B:
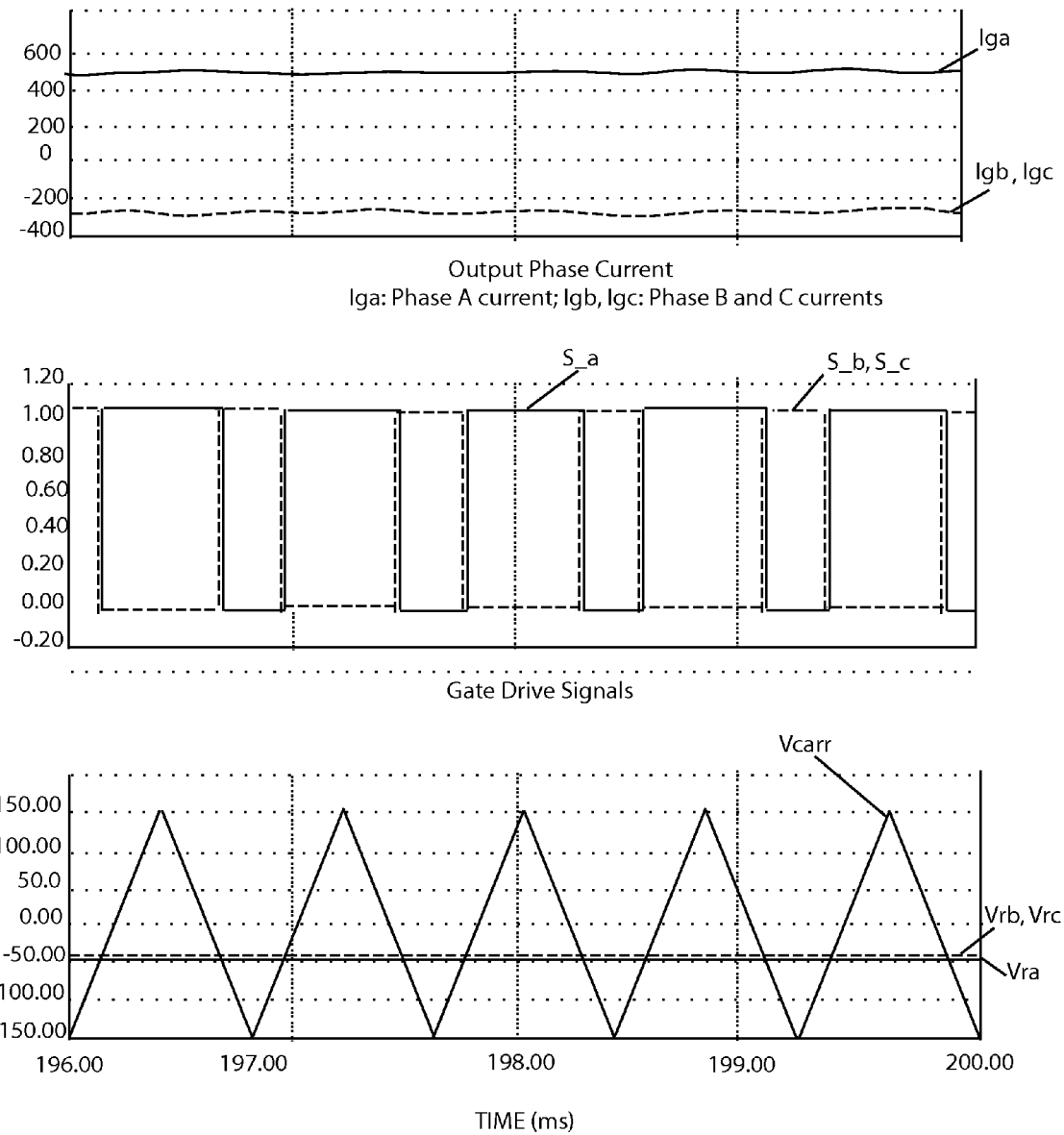
FIG. 8B shows inverter currents and signals using a shifted PWM modulation signal.

FIG. 8B shows the results when a PWM strategy for reducing hotspot temperature is performed. Here the reference voltages Vra, Vrb, and Vrc have been shifted to a lower value of −50.00. While the carrier frequency Vcarr remains the same, the shifted reference voltages alter the PWM signals Sa, Sb, and Sc as shown, and reduce the inverter duty cycle. Referring to FIGS. 9 and 10, which also show results when a PWM loss reduction strategy is implemented, the phase leg A duty cycle using a shifted reference voltage is decreased to 0.37 from the 0.527 duty cycle associated with the use of unshifted reference voltages. The power losses of the inverter are shifted from devices with higher power losses to devices with lower power losses. For example, for phase leg A, the power loss associated with the upper $IGBT_{UA}$ has been decreased while that associated with the lower diode $D_{LA}$ has been increased. While the total loss for the phase leg A is not significantly changed, decreasing the average current and power loss associated with the $IGBT_{UA}$ reduces the hotspot temperature that the device must be able to tolerate. As a result, various trade-off design possibilities regarding IGBT and diode sizing and costs are available to inverter designers. For example, IGBTs can be downsized, or the maximum capacities of currently existent inverters increased. It is noted that while the inverter duty cycle has been reduced, inverter currents Iga, Igb, and Igc, remain unchanged when PWM shifting is implemented. Thus, maximum power losses, or resultant hotspot temperature can be reduced without affecting inverter output.

As shown in FIGS. 9, 10, for the rotor lock case exemplified by FIGS. 8A, 8B, PWM shifting can more evenly balance the phase leg A power losses between the upper $IGBT_{AU}$ and the lower $D_{AL}$. For example, without PWM shifting, the power loss at the upper $IGBT_{AU}$ was 673 W, whereas with PWM shifting the loss was reduced to 551 W. Similarly, the power losses of phase legs B, C are more evenly balanced between the IGBT devices and the diode devices, alleviating stress on the IGBT devices. The invention enables power device downsizing since the hotspot temperature for the IGBT devices will be lowered. Because power device cost is the dominant factor contributing to inverter total cost, the ability to downsize components can significantly reduce inverter hardware costs.

While FIGS. 8A, 8B show one example of motor-lock conditions in an inverter, with current concentrated in the upper portion of phase leg A, it is understood that there are six possible inverter current configurations that can occur when a motor is in a rotor-locked state. Current can be concentrated in the upper portion or the lower portion of each of the three phase legs A, B, and C. For each case, the invention can migrate current from a device with higher losses to a device with lower losses. By controlling the drive signals through implementation of a PWM loss reduction strategy, current migration can occur from an IGBT to a diode, or from a diode to an IGBT, and can be performed with or without changing the carrier frequency, thus providing a simple, economical solution that can avoid dependence on complex and costly software.

The invention provides apparatus and methods for reducing the maximum power loss at an inverter power device, thereby reducing its hotspot temperature, without adversely affecting inverter performance. During motor-lock operation, inverter current can be concentrated in a single phase leg, causing a power device to heat up and result in a hotspot temperature. A PWM strategy is provided to migrate the current from a higher loss device to a lower loss device, reducing the temperature at the higher loss device. In an exemplary embodiment, a reference voltage is shifted to a lower value, reducing the duty cycle of the inverter and more equitably balancing current flow through upper and lower portions of a phase leg. The strategy can be performed regardless of carrier frequency and without changing the carrier frequency. A PWM loss reduction strategy can shift PWM duty cycles toward the direction of lower overall conduction losses. During rotor-lock operation, power loss is migrated from the highest power loss devices to others, which can noticeably reduce the inverter hotspot temperature. For example, the inverter hotspot temperature can be reduced by about twenty percent. Inverter hotspot temperature reduction allows inverter power devices to be downsized, decreasing hardware costs. For current inverter designs, implementation of a loss reduction PWM strategy can improve inverter maximum capacities. During normal motor drive operations, i.e. non rotor-lock operation, a PWM loss reduction strategy implemented by shifting a PWM modulation signal can push the modulation to the extreme to become discontinuous PWM (DPWM), which can minimize switching losses in addition to the conduction losses.

The invention claimed is:

1. A system, comprising:
   an inverter circuit configured to provide a first phase current to a first stator winding of a permanent magnet synchronous machine (PMSM), a second phase current to a second stator winding of said PMSM, and a third phase current to a third stator winding of said PMSM;
   a pulse width modulation (PWM) strategy module (PSM) configured to implement a loss reduction strategy to decrease conduction loss at said inverter circuit, said PSM comprising a status determination module configured to detect a rotor-lock condition of said PMSM, a PWM strategy control module configured to control implementation of a PWM loss reduction strategy for said inverter circuit and reduce conduction loss at said inverter circuit during a rotor-lock condition, and a shift signal module configured to provide a shift signal for modifying a modulation signal used in combination with a PWM carrier signal; and
   wherein said PWM strategy control module is configured to implement said loss-reduction strategy and said shift signal module is configured to provide said shift signal for combination with said modulation signal to provide a shifted modulation signal to be compared with said PWM carrier signal to produce shifted PWM control signals for said inverter circuit.

2. The system of claim 1, wherein said PSM is configured to migrate said at least one of said phase currents when said PMSM is in a rotor lock condition.

3. The system of claim 1, wherein said PSM is configured to migrate said at least one of said phase currents from an insulated gate bipolar transistor (IGBT) of a phase leg to a diode of said phase leg.

4. The system of claim 1, wherein said PSM is configured to migrate said at least one of said currents from a diode of a phase leg to an IGBT of said phase leg.

5. The system of claim 1, wherein said loss reduction strategy is configured to produce discontinuous PWM signals during non-rotor lock operation of said PMSM.

6. The system of claim 1, wherein said PWM strategy control module is configured to implement said loss-reduction strategy and said shift signal module is configured to provide said shift signal for combination with said modulation signal to provide a shifted modulation signal for combination with any said PWM carrier signal.

7. A method, comprising:
   a pulse width modulation (PWM) strategy control module implementing a loss-reduction strategy;
   a shift signal module providing a shift signal for modifying a modulation signal configured for combination with a PWM carrier signal to a signal combiner configured to combine said shift signal and a reference signal to provide a shifted reference signal;
   said signal combiner combining said shift signal and said modulation signal to provide a shifted modulation signal;
   a comparator comparing said shifted modulation signal and said PWM carrier signal to provide a shifted PWM control signal for an inverter circuit coupled to a permanent magnet synchronous machine (PMSM);
   wherein said shifted PWM control signal is configured to reduce power loss at said inverter circuit; and
   wherein said PWM strategy control module is coupled to a status determination module configured to detect a rotor-lock condition at said PMSM.

8. The method of claim 7, wherein said modulation signal comprises a dc voltage.

9. The method of claim 8, wherein said shifted modulation signal is lower than said modulation signal.

10. The method of claim 7, wherein said shifted PWM control signal is configured to migrate a phase current at said inverter circuit from an insulated gate bipolar transistor (IGBT) to a diode.

11. The method of claim 7, wherein said shifted PWM control signal is configured migrate a phase current at said inverter circuit from a diode to an insulated gate bipolar transistor (IGBT).

12. The method of claim 7, further comprising:
    determining that said PMSM is no longer in a rotor-lock state; and
    ceasing implementation of said PWM strategy.

13. The method of claim 7, wherein said implementing said PWM strategy comprises migrating a phase current from a higher loss device to a lower loss device in a phase leg of an inverter circuit coupled to at least one stator winding of said PMSM.

14. The method of claim 7, wherein said implementing said loss reduction strategy leaves said PWM carrier frequency unchanged.

15. The method of claim 7, wherein said implementing said loss reduction strategy comprises lowering a dc reference signal configured for combination with said PWM carrier signal.

16. The method of claim 7, wherein said inverter circuit is part of an electric drive system for an electrified vehicle.

17. The method of claim 7, wherein said PWM strategy control module is configured to implement said loss-reduction strategy, and said shift signal module is configured to provide said shift signal for combination with said modulation signal to provide a shifted modulation signal for any said PWM carrier signal.

18. An apparatus, comprising:
    a status determination module configured to detect a rotor-lock condition of a permanent magnet synchronous machine (PMSM) coupled to an inverter circuit;
    a pulse width modulation (PWM) strategy control module configured to control implementation of a PWM loss reduction strategy for said inverter circuit;
    a shift signal module configured to provide a shift signal for modifying a modulation signal used in combination with a PWM carrier signal;
    wherein said PWM strategy control module is configured to reduce conduction loss at said inverter circuit during a rotor-lock condition; and
    wherein said PWM strategy control module is configured to implement said loss-reduction strategy, and said shift signal module is configured to provide said shift signal in combination with the modulation signal to provide a shifted modulation signal to be compared with the PWM carrier signal to produce shifted PWM control signals for said inverter circuit.

19. The apparatus of claim 18, wherein said apparatus is configured to migrate a phase current from a higher loss device of a phase leg of said inverter circuit to a lower loss device of said phase leg.

20. The apparatus of claim 18, wherein said apparatus is configured to migrate a phase current from an insulated gate bipolar transistor (IGBT) of a phase leg of said inverter circuit to a diode of said phase leg.

21. The apparatus of claim 18, wherein said apparatus is configured to migrate a phase current from a diode of a phase leg of said inverter circuit to an insulated gate bipolar transistor (IGBT) of said phase leg.

22. The apparatus of claim 18, wherein said shift signal is configured to modify a dc voltage.

23. The apparatus of claim 22, wherein said shift signal is configured to lower said dc voltage.

24. The apparatus of claim 18, wherein said PWM loss reduction strategy is configured to provide discontinuous PWM signals for said inverter circuit during non-rotor-lock operation of said PMSM.

25. The apparatus of claim 18, wherein said strategy control module is configured to implement said loss reduction strategy in response to a determination that said PMSM is in a rotor-lock condition.

* * * * *